(12) United States Patent
Chou

(10) Patent No.: US 12,050,833 B2
(45) Date of Patent: Jul. 30, 2024

(54) METHOD AND APPARATUS FOR SCREEN DISPLAY

(71) Applicant: ASUSTeK COMPUTER INC., Taipei (TW)

(72) Inventor: Po-Wei Chou, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 17/732,536

(22) Filed: Apr. 29, 2022

(65) Prior Publication Data

US 2022/0350561 A1 Nov. 3, 2022

(30) Foreign Application Priority Data

May 3, 2021 (TW) .................................. 110115859

(51) Int. Cl.
*G06F 3/14* (2006.01)
*G09G 3/20* (2006.01)

(52) U.S. Cl.
CPC ......... *G06F 3/1431* (2013.01); *G09G 3/2096* (2013.01); *G09G 2354/00* (2013.01); *G09G 2370/025* (2013.01); *G09G 2370/04* (2013.01); *G09G 2370/16* (2013.01)

(58) Field of Classification Search
CPC ................ G06F 3/1431; G09G 3/2096; G09G 2354/00; G09G 2370/025; G09G 2370/04; G09G 2370/16
See application file for complete search history.

(56) References Cited

U.S. PATENT DOCUMENTS

| 2010/0138780 | A1* | 6/2010 | Marano | .................... G06F 9/452 |
| | | | | 715/781 |
| 2010/0299436 | A1* | 11/2010 | Khalid | ................ G06F 3/04886 |
| | | | | 709/226 |
| 2014/0211026 | A1* | 7/2014 | Sakai | ................. H04N 1/00408 |
| | | | | 348/207.2 |
| 2017/0108997 | A1* | 4/2017 | Kim | ...................... G06F 40/143 |

(Continued)

FOREIGN PATENT DOCUMENTS

| CN | 107908386 | 4/2018 |
| CN | 111324327 | 6/2020 |

(Continued)

*Primary Examiner* — Matthew A Eason
*Assistant Examiner* — Sujit Shah
(74) *Attorney, Agent, or Firm* — JCIPRNET

(57) ABSTRACT

A method and an apparatus for screen display are provided. The method is adapted to an electronic apparatus including a processor and a memory. The method includes the following steps: installing a virtual display card driver; making one or more network connections with one or more selected apparatuses in an adjacent area; creating one or more virtual screens corresponding to the one or more selected apparatuses through the virtual display card driver; encoding one or more pictures of the one or more virtual screens to generate one or more encoded videos; and transmitting the one or more encoded videos to the corresponding one or more selected apparatuses respectively through the one or more network connections, to display the one or more pictures of the corresponding one or more virtual screens on one or more screens of the one or more selected apparatuses respectively.

8 Claims, 3 Drawing Sheets

(56) References Cited

U.S. PATENT DOCUMENTS

| | | | | |
|---|---|---|---|---|
| 2019/0042177 A1* | 2/2019 | Tanner | ............... | G06F 3/1454 |
| 2019/0250757 A1* | 8/2019 | Han | ............... | H04N 5/23229 |
| 2020/0412862 A1* | 12/2020 | Oh | ............... | H04W 76/14 |
| 2021/0200501 A1* | 7/2021 | Stankoulov | ............... | G06F 3/0488 |

FOREIGN PATENT DOCUMENTS

| | | |
|---|---|---|
| CN | 111611017 | 9/2020 |
| CN | 112422877 | 2/2021 |

\* cited by examiner

METHOD AND APPARATUS FOR SCREEN DISPLAY

CROSS-REFERENCE TO RELATED APPLICATION

This application claims the priority benefit of Taiwan application serial No. 110115859, filed on May 3, 2021. The entirety of the above-mentioned patent application is hereby incorporated by reference herein and made a part of the specification.

BACKGROUND OF THE INVENTION

Field of the Invention

The disclosure relates to an electronic apparatus, and in particular, to an electronic apparatus including a screen.

Description of the Related Art

A current local terminal needs to transmit a video to an external screen by using a connection port, such as a video graphics array (VGA) connector, a digital visual interface (DVI), a high definition multimedia interface (HDMI), or a DisplayPort. Not all handheld apparatuses or computers are each configured with a suitable connection port. Therefore, the usability of the old handheld apparatuses or computers as external screens is reduced.

BRIEF SUMMARY OF THE INVENTION

According to the first aspect, a method for screen display applied to an electronic apparatus including a processor and a memory is provided. The method includes the following steps: installing a virtual display card driver; making one or more network connections with one or more selected apparatuses in an adjacent area; creating one or more virtual screens corresponding to the one or more selected apparatuses respectively through the virtual display card driver; encoding one or more pictures of the one or more virtual screens to generate one or more encoded videos; and transmitting the one or more encoded videos to the corresponding one or more selected apparatuses respectively through the one or more network connections, to display the one or more pictures of the corresponding one or more virtual screens on one or more screens of the one or more selected apparatuses respectively.

According to the second aspect, an apparatus for screen display is provided. The apparatus for screen display includes a memory, a network card, and a processor. The memory is configured to store data. The network card is configured to make a network connection. The processor, coupling the memory and the network card, is configured to load and run an application to execute the following steps: installing a virtual display card driver; making, through the network card, one or more network connections with one or more selected apparatuses in an adjacent area; requesting the virtual display card driver to create one or more virtual screens corresponding to the one or more selected apparatuses respectively; encoding one or more pictures of the one or more virtual screens to generate one or more encoded videos; and transmitting the one or more encoded videos to the corresponding one or more selected apparatuses respectively through the one or more network connections, to display the one or more pictures of the corresponding one or more virtual screens on one or more screens of the one or more selected apparatuses respectively.

Based on the above, in the method and apparatus for screen display of the disclosure, the virtual screen is first created by using the virtual display card driver, and then the picture of the virtual screen is projected onto the screen of the external apparatus through the network connection. Therefore, the picture is projected onto the screen of the external apparatus without a specific connection port, thereby greatly increasing the usability of an old handheld apparatus or computer as an external screen.

To make the features and advantages of the disclosure more comprehensible, a detailed description is made below with reference to the accompanying drawings by using embodiments.

DETAILED DESCRIPTION OF THE EMBODIMENTS

Figure 1:
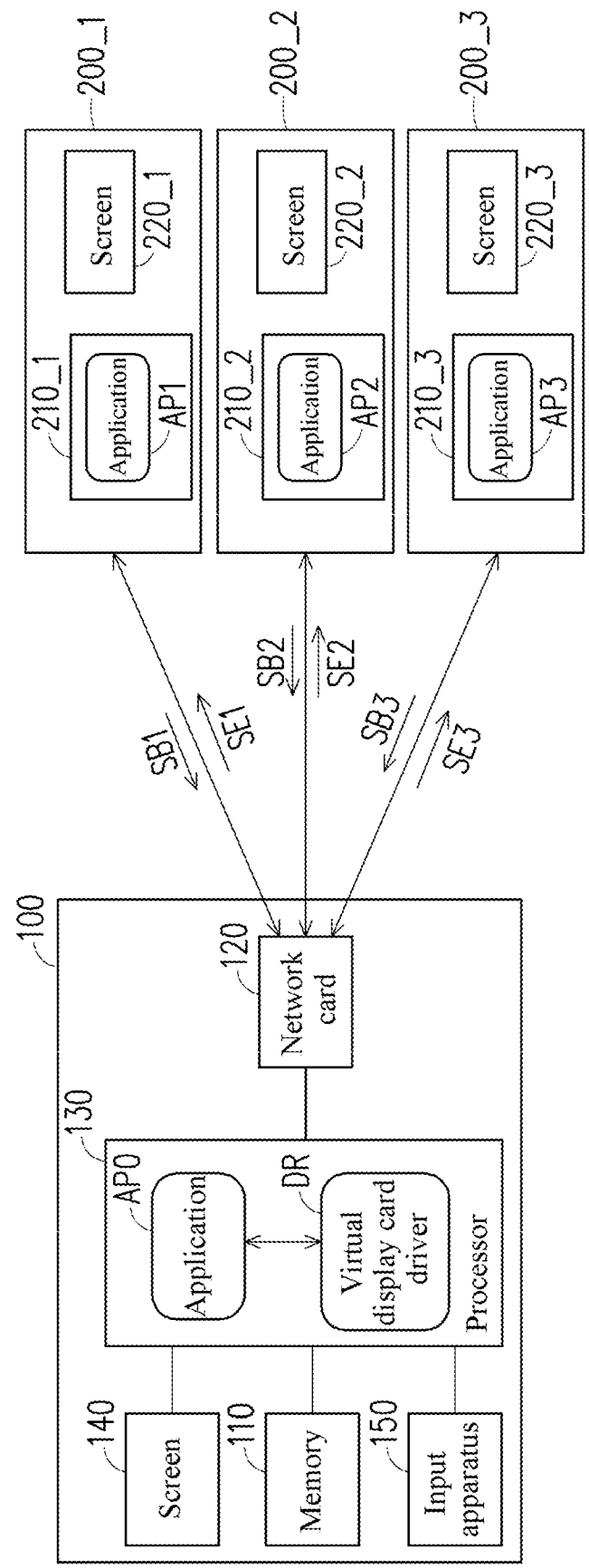
FIG. 1 is a block diagram of an apparatus for screen display according to an embodiment of the disclosure.

Referring to FIG. 1, an apparatus 100 for screen display of this embodiment is an electronic apparatus, such as, a personal computer, a smartphone, a personal digital assistant (PDA), a PDA mobile phone, a notebook computer, a tablet computer, or a smart TV. The apparatus includes a memory 110, a network card 120, a processor 130, a screen 140, and an input apparatus 150.

The memory 110 is configured to store data such as an image, data, and a program code, in an embodiment, which is a fixed or removable random access memory (RAM) of any type, a read-only memory (ROM), a flash memory, a hard disk or another similar apparatus, an integrated circuit, or a combination thereof.

In an embodiment, the network card 120 is a wireless network card supporting various wireless communication standards, such as, a Bluetooth communication protocol, a Wireless Fidelity (Wi-Fi) communication protocol, or Wi-Fi Direct, or a network card supporting wired networking. The network card makes, through a wired or wireless manner, network connections with external selected apparatuses 200_1 to 200_3. As shown in FIG. 1, each selected apparatus 200_1 to 200_3 includes a processor (210_1 to 210_3) and a screen (220_1 to 220_3).

In an embodiment, the processor 130 is a central processing unit (CPU), another programmable general-purpose or special-purpose microprocessor, a digital signal processor (DSP), a programmable controller, an application-specific integrated circuit (ASIC), or another similar apparatus, or a combination thereof.

In an embodiment, the screen 140 is a screen or a TV using a liquid crystal display (LCD), a light-emitting diode (LED), a field emission display (FED), or another type of panel, and receives an externally inputted signal to display a picture.

In an embodiment, the input apparatus 150 is a mouse, a touchpad, or a touch panel with resistive, capacitive, or another type of touch sensing component, and is combined with the screen 140 to form a touchscreen, to receive a touch operation of a user on the picture displayed on the screen 140.

As shown in FIG. 1, the processor 130 is coupled to the memory 110, the network card 120, the screen 140, and the input apparatus 150. in an embodiment, the processor 130 loads and executes an application AP0 from the memory 110, to control an action of displaying the picture on the external screen. The following describes detailed steps of the method for screen display of the disclosure with reference to embodiments.

Figure 2:
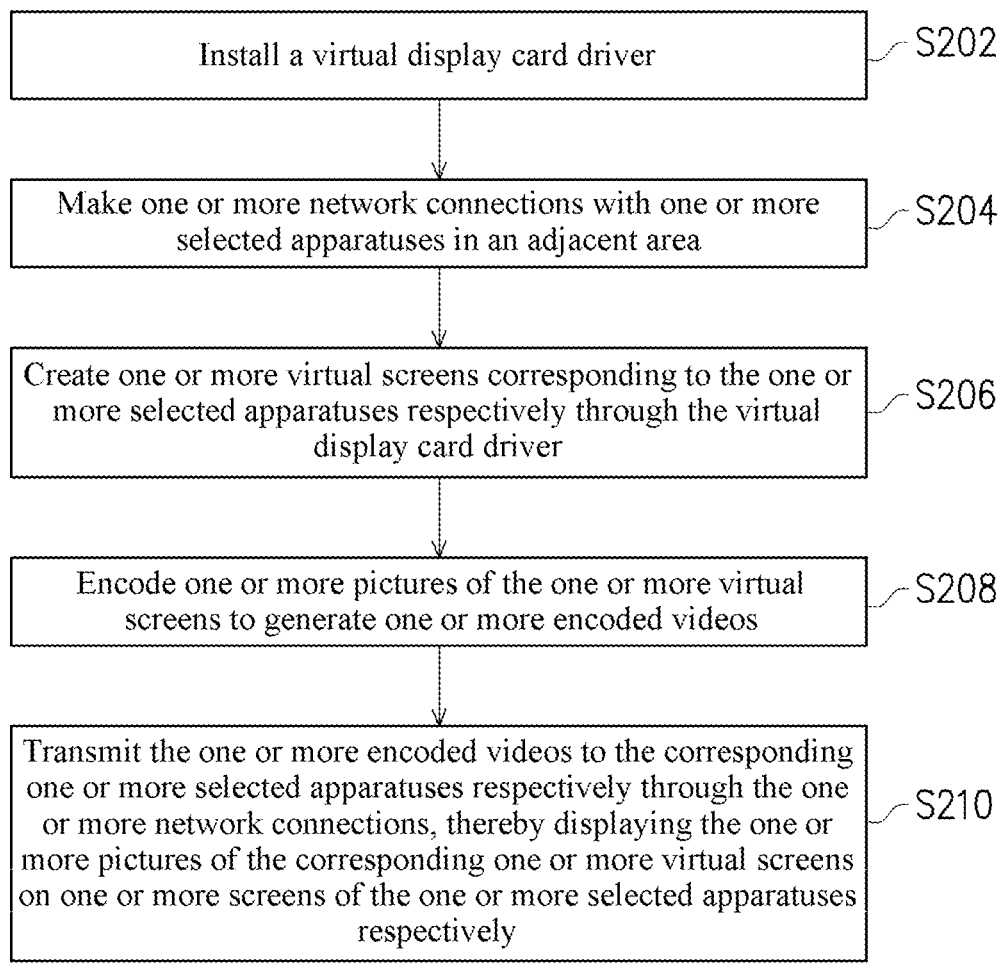
FIG. 2 is a flowchart of a method for screen display according to an embodiment of the disclosure.

FIG. 2 is a flowchart of a method for screen display according to an embodiment of the disclosure; and Referring to FIG. 1 and FIG. 2 together, the method of this embodiment is applicable to the apparatus 100 for screen display in FIG. 1, and includes the following steps:

First, a processor 130 executes an application AP0, to install a virtual display card driver DR (step S202).

Then, the processor 130 executes the application AP0, to make, through a network card 120, network connections with selected apparatuses 200_1 to 200_3 in an adjacent area (step S204). Specifically, the processor 130 receives, through the network card 120, broadcast signals from a plurality of external apparatuses in the adjacent area (in an embodiment, broadcast signals SB1 to SB3 from the selected apparatuses 200_1 to 200_3). Therefore, the processor 130 determines whether the external apparatuses have a projection function according to the broadcast signals, and only list the external apparatus having the projection function on the screen 140, for a user to make a selection. In this case, the processor 130 receives, through the input apparatus 150, a selecting operation from the user, to select a selected apparatus from the listed plurality of external apparatuses. In this embodiment, the selected apparatuses 200_1 to 200_3 in FIG. 1 are used as selected apparatuses selected by the user. After the selection is completed, the processor 130 makes, through the network card 120, point-to-point network connections with the selected apparatuses 200_1 to 200_3.

It is to be noted that this embodiment does not limit the manner of determining the networking. In another embodiment, the processor 130 notifies, through the network card 120, an external apparatus that the current apparatus has a projection function, and then the external apparatus determines whether to make networking with the current apparatus.

Then, the processor 130 executes the application AP0, to create virtual screens corresponding to selected apparatuses 200_1 to 200_3 respectively through a virtual display card driver DR (step S206).

Figure 3:
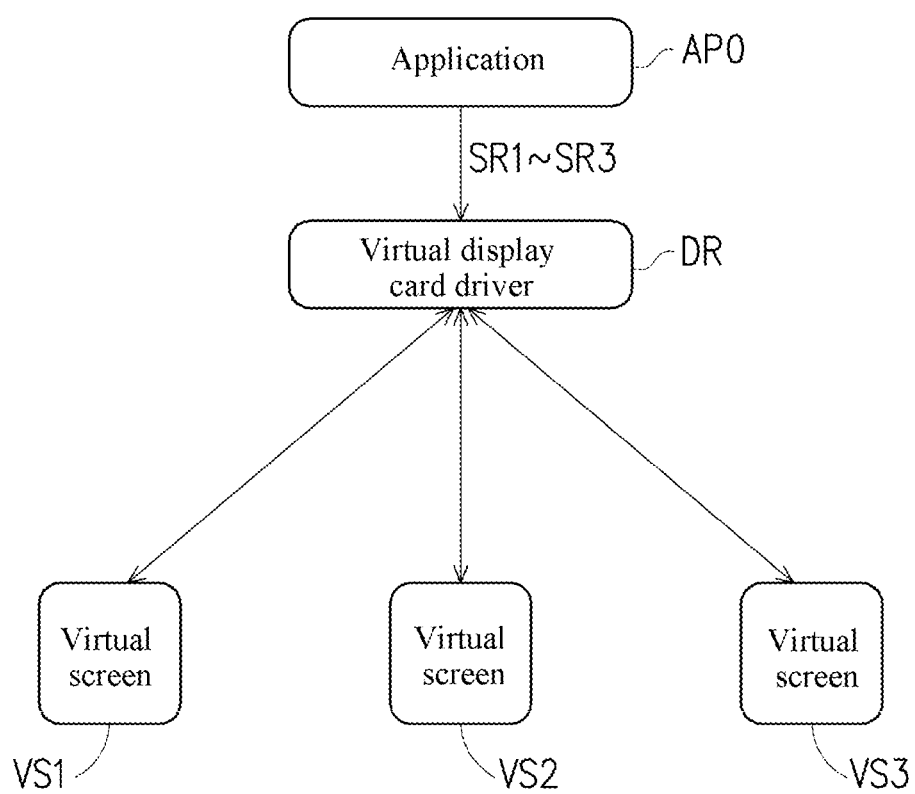
FIG. 3 is an example of a method for screen display according to an embodiment of the disclosure.

Referring to FIG. 1 and FIG. 3 together, in this embodiment, broadcast signals SB1 to SB3 from selected apparatuses 200_1 to 200_3 received by a processor 130 include screen resolution information SR1 to SR3 of the selected apparatuses 200_1 to 200_3 respectively. As shown in FIG. 3, the processor 130 executes an application AP0, to transmit the screen resolution information SR1 to SR3 to a virtual display card driver DR, and requests the virtual display card driver DR to create corresponding virtual screens VS1 to VS3 respectively according to the screen resolution information SR1 to SR3 of the selected apparatuses 200_1 to 200_3. In an embodiment, the created virtual screens VS1 to VS3 are displayed in a device manager in an operating system of the apparatus 100 for screen display. In an embodiment, pictures of the virtual screens VS1 to VS3 are directly displayed on the screen 140.

Referring back to FIG. 1 and FIG. 2, in this embodiment, after the virtual screens VS1 to VS3 are created, when pictures appear on the virtual screens VS1 to VS3, the processor 130 shares, through a shared memory in the memory 110, the pictures of the virtual screens VS1 to VS3 to the application AP0, to enable the application AP0 to encode the pictures of the virtual screens VS1 to VS3, thereby generating encoded videos SE1 to SE3 (step S208). In this embodiment, the encoding performed by the application AP0 meets the video coding standard H.264 or the like.

Then, the processor 130 transmits, through network connections of the network card 120, the encoded videos SE1 to SE3 to the corresponding selected apparatuses 200_1 to 200_3 respectively, to display pictures of the corresponding virtual screens VS1 to VS3 on the screens 220_1 to 220_3 of the selected apparatuses 200_1 to 200_3 respectively (step S210). Specifically, the processors 210_1 to 210_3 of the selected apparatuses 200_1 to 200_3 execute the applications AP1 to AP3 respectively, to receive the encoded videos SE1 to SE3, and decode the encoded videos immediately, to display pictures of the virtual screens VS1 to VS3 restored after decoding on the screens 220_1 to 220_3 respectively.

With the foregoing method, the transmission of the video is completed through the network connection, to use any old apparatus with a network function as an external screen (in an embodiment, an extended screen).

In an embodiment, the processors 210_1 to 210_3 of the selected apparatuses 200_1 to 200_3 receive, through the screens 220_1 to 220_3, touch operations from a user, and generate touch information to transmit the touch information to the 100 apparatus for screen display at a local terminal. Based on this, the processor 130 receives the touch information from the selected apparatuses 200_1 to 200_3, to simulate corresponding touch events on the virtual screens VS1 to VS3, and performs subsequent corresponding operations.

Based on the above, in the method and apparatus for screen display of the disclosure, the virtual screen is first created by using the virtual display card driver, and then the picture of the virtual screen is projected onto the screen of the external apparatus through the network connection. Therefore, the flexibility of using various handheld apparatuses or computers with different connection ports as external screens is increased.

What is claimed is:

1. A method for screen display, applied to an electronic apparatus comprising a processor, a screen, an input apparatus and a memory, the method comprising the following steps:

installing a virtual display card driver;

making one or more network connections with one or more selected apparatuses in an adjacent area, comprising:

receiving broadcast signals from a plurality of external apparatuses in the adjacent area;

determining whether the plurality of external apparatuses has a projection function for projecting pictures generated by other devices onto a screen according to the broadcast signals, wherein the broadcast signals comprise screen resolution information of the external apparatus having the projection function;

only listing the plurality of external apparatuses having the projection function on the screen of the electronic apparatus for selection; and receiving a selecting operation through the input apparatus, to select the one or more selected apparatuses from the listed plurality of external apparatuses, after receiving the selecting operation, executing an application to transmit the screen resolution information to the virtual display card driver, and requesting the virtual display card driver to create the corresponding one or more virtual screens respectively according to the screen resolution information of the one or more selected apparatuses recorded in the corresponding broadcast signal;

encoding one or more pictures of the one or more virtual screens to generate one or more encoded videos; and transmitting the one or more encoded videos to the corresponding one or more selected apparatuses respectively through the one or more network connections, to display the one or more pictures of the corresponding one or more virtual screens on one or more screens of the one or more selected apparatuses respectively.

2. The method for screen display according to claim 1, wherein the step of making one or more network connections with one or more selected apparatuses in an adjacent area further comprises:

making one or more point-to-point network connections with the one or more selected apparatuses.

3. The method for screen display according to claim 1, wherein the memory comprises a shared memory, and before the step of encoding one or more pictures of the one or more virtual screens to generate one or more encoded videos, the method further comprises:

sharing, through the shared memory, the one or more pictures of the one or more virtual screens to the application performing picture encoding when one or more pictures appear on the one or more virtual screens.

4. The method for screen display according to claim 1, further comprising:

receiving touch information from the one or more selected apparatuses, to simulate one or more corresponding touch events on the one or more virtual screens.

5. An apparatus for screen display, comprising:
a memory, configured to store data;
a network card, configured to make a network connection;
a screen;
an input apparatus; and
a processor, coupling the memory and the network card, configured to load and run an application to execute the following steps:
installing a virtual display card driver;
making, one or more network connections between the network card and one or more selected apparatuses in an adjacent area;
requesting the virtual display card driver to create one or more virtual screens corresponding to the one or more selected apparatuses respectively;

encoding one or more pictures of the one or more virtual screens to generate one or more encoded videos; and transmitting the one or more encoded videos to the corresponding one or more selected apparatuses respectively through the one or more network connections, to display the one or more pictures of the corresponding one or more virtual screens on one or more screens of the one or more selected apparatuses respectively, wherein the processor receives broadcast signals from a plurality of external apparatuses in the adjacent area, determines whether the plurality of external apparatuses has a projection function for projecting pictures generated by other devices onto a screen according to the broadcast signals, only lists the plurality of external apparatuses having the projection function on the screen of the apparatus for screen display for selection, and receives a selecting operation through the input apparatus, to select the one or more selected apparatuses from the listed plurality of external apparatuses, wherein the broadcast signals comprise screen resolution information of the external apparatus having the projection function, after receiving the selecting operation, the processor executes the application to transmit the screen resolution information to the virtual display card driver, and requests the virtual display card driver to create the corresponding one or more virtual screens respectively according to the screen resolution information of the one or more selected apparatuses recorded in the corresponding broadcast signal.

6. The apparatus for screen display according to claim 5, wherein the processor makes, through the network card, one or more point-to-point network connections with the one or more selected apparatuses.

7. The apparatus for screen display according to claim 5, wherein the memory comprises a shared memory, and the processor shares, through the shared memory, the one or more pictures of the one or more virtual screens to the application that performs picture encoding when one or more pictures appear on the one or more virtual screens.

8. The apparatus for screen display according to claim 5, wherein the processor receives touch information from the one or more selected apparatuses, to simulate one or more corresponding touch events on the one or more virtual screens.

* * * * *